Aug. 19, 1952   R. POLK, SR., ET AL   2,607,381
METHOD OF SECTIONIZING CITRUS FRUITS
Filed May 26, 1950   2 SHEETS—SHEET 1
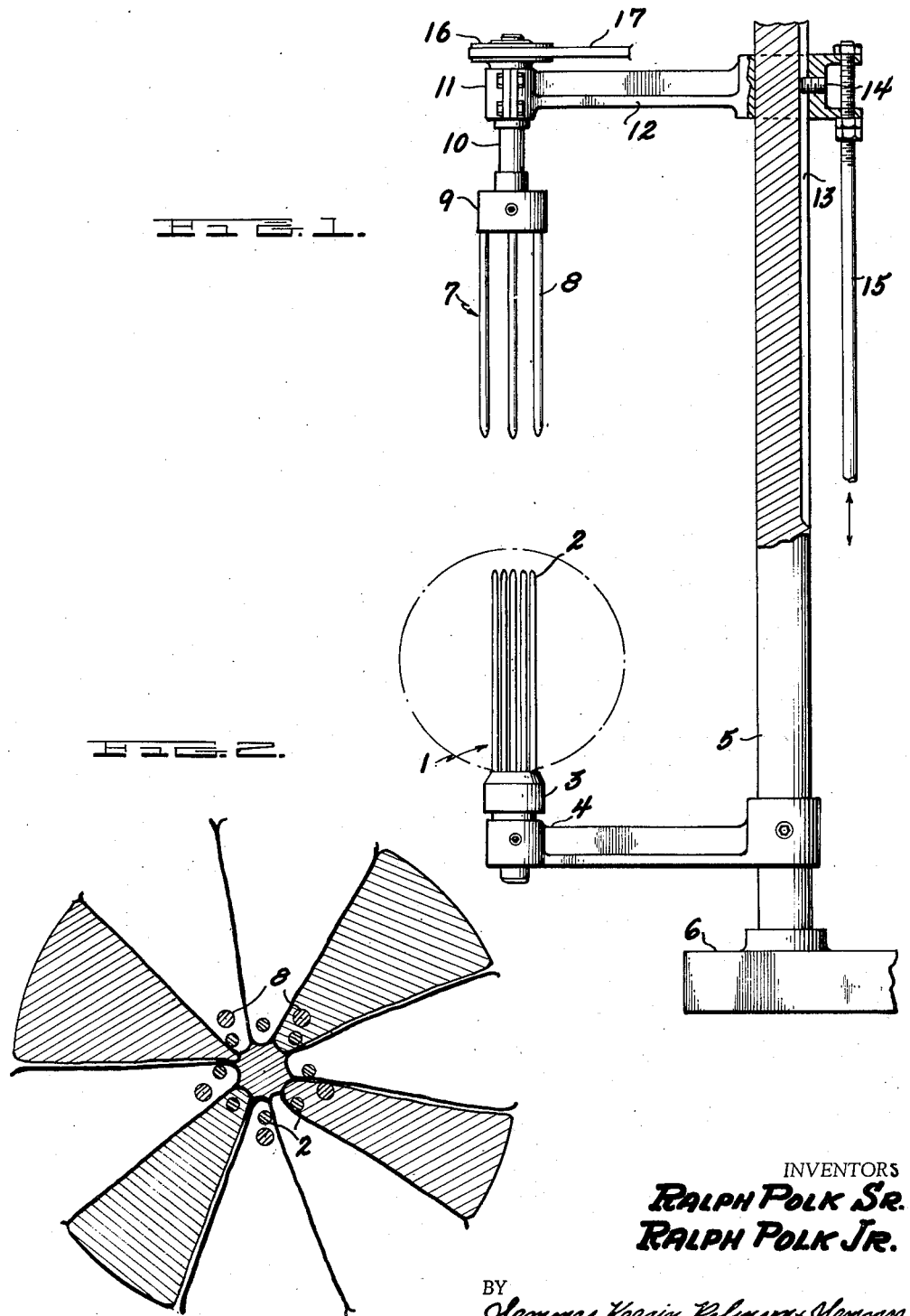
INVENTORS
*Ralph Polk Sr.*
*Ralph Polk Jr.*
BY *Semmes, Keegin, Robinson & Semmes*
ATTORNEYS Aug. 19, 1952     R. POLK, SR., ET AL     2,607,381
METHOD OF SECTIONIZING CITRUS FRUITS
Filed May 26, 1950     2 SHEETS—SHEET 2
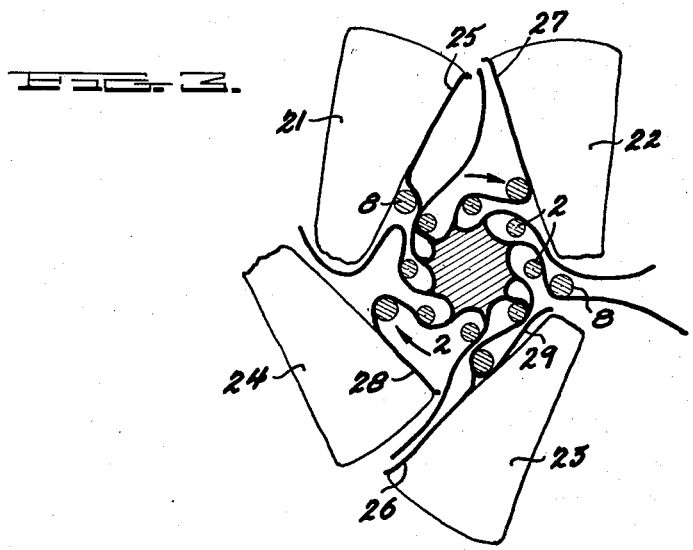
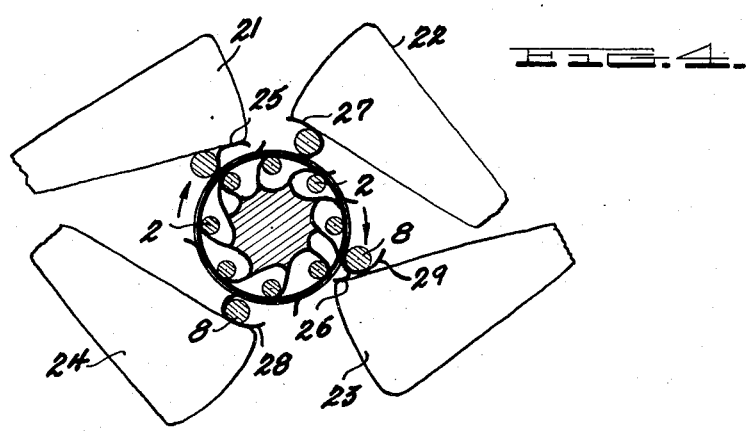
INVENTORS
RALPH POLK SR.
RALPH POLK JR.
By
Semmes, Keegin, Robinson & Semmes
ATTORNEYS Patented Aug. 19, 1952

2,607,381

UNITED STATES PATENT OFFICE 2,607,381

METHOD OF SECTIONIZING CITRUS FRUITS

Ralph Polk, Sr., and Ralph Polk, Jr., Tampa, Fla., assignors to The Polk Development Company, Tampa, Fla., a copartnership of Florida Application May 26, 1950, Serial No. 164,397

6 Claims. (Cl. 146—236)

This invention relates to a method of sectionizing citrus fruit and more particularly to a method for the separation of the juice sacs and section walls of all of the sections of the fruit with a minimum crushing of the juice sacs of the fruit.

Citrus fruits are composed of a number of wedge-shaped sections of juice bearing pulp or sacs separated by a membrane usually designated as a section wall. The membrane extends completely around the outer surface of the sections and is covered by a layer known as the albedo, and the peel. The sections surround a pithy core and ordinarily vary in number between 9 and 15 in the average fruit. The individual sections of a single fruit will vary widely in the size of the individual sections, when measured from the apex to the periphery, and in the included angle of each section. There may also be a considerable variation in the distance of the apex of each section from the center of the fruit. Moreover, there is a marked variation in the size and shape of the sections of fruit from one individual fruit to another. The extreme irregularity of the size and shape of the sections has heretofore prevented the sectionizing of citrus fruit by machinery in a commercially acceptable manner.

In the usual processing of citrus fruits to remove separate sections, the outer peel and albedo of the fruit is removed to expose the membrane enclosing the sections. The fruit is then passed through a hot lye bath which removes the outer membrane but leaves the section walls between adjacent sections. In some instances, the lye peeled fruit is then passed through a bath of cold water to harden the fruit and facilitate its further processing. After the removal of the outer membrane, the usual procedure is to remove the individual sections by hand by passing a dull knife around each of the sections to separate it from the adjacent section walls.

In a large sectionizing plant a large number of employees are required for the step of removing the sections of fruit from the section wall. The resultant large labor cost has caused many attempts to mechanize the procedure. In most of the machines, an attempt is usually made to direct parting knives along the bond joining the juice sacs of a section to the section wall by machinery. While the removal of complete, unbroken sections may be obtained with machinery of this type, the wide variation in the number and angle of the sections from one fruit to another, and the irregularity of the sections in an individual fruit, makes it practically impossible to direct a parting knife accurately along the section walls to obtain complete removal of all of the sections. Slitting of the bond connecting the sections with one adjacent section wall may be obtained without great difficulty, but once one bond has been ruptured, the fruit loses much of its firmness and it becomes increasingly difficult to direct a knife accurately along the other section wall by mechanical means.

One method of sectionizing citrus fruits which partially overcomes the difficulty resulting from the irregularity in the sections is described in our Patent No. 2,199,345, entitled "Method for Removing Citrus Juice Cells from Inedible Portions," issued on April 30, 1940. In that patented process, a peeled fruit is mounted on a holder having a series of tines passing through the apices of a large number of sections. The fruit is then slit along some of the bonds of the section walls with the juice sacs in the section. A spinner having a plurality of rods is then inserted polarwise through the fruit with the tines lying just outside of the tines of the holder, and is rotated while the holder remains stationary. Rotation of the sections is prevented by engagement with adjacent sections of the fruit; and, after rotation of the spinner through a small arc, further rotation places the section walls under strong tension which increases until it finally is sufficient to overcome the bond joining a section to the entire area of a section wall and shear the walls from the juice sacs in the section. The tension on the section walls often causes them to break before there is a slip-rupture of the bond the sections, particularly with mature, lye peeled fruit. In addition, the compression of the sections as the rods rotate causes excessive crushing of the fruit.

It is an object of this invention to provide a method of sectionizing citrus fruits.

A further object of this invention is the provision of a method for separating substantially all sections from citrus fruit in substantially unbroken form from the connecting membrane or section walls.

A further object of this invention is to separate the juice sacs from the section walls by rolling the juice sacs in the sections back away from the section walls.

Still another object of this invention is to provide a method for separating sections from the section walls of citrus fruit in which the section walls are subjected to minimum stresses.

It is also another object of this invention to provide a method for sectionizing citrus fruit by automatic machinery in which the force separating the sections from the section walls is substantially perpendicular to the walls and is exerted along a minimum area at any one instant.

With these and other objects in view, as will become apparent in the following detailed description, this invention resides in a method for sectionizing citrus fruit in which a large portion of the sections are removed from peeled fruit and the remaining sections are then removed by exerting a relative rotational force between the core and the section walls against the section walls of the fruit to roll the sections away from the walls.

In the drawings:

Figure 1 is an elevational view partly in section of apparatus suitable for use in certain steps of the process of this invention;

Figure 2 is a sectional view across the diameter of a citrus fruit perpendicular to its core prior to the removal of the sections remaining after a preliminary slitting operation;

Figure 3 is a diagrammatic view at an early stage in the final stripping of all of the sections from the core and section walls of the fruit in which the spinner is moved around the holder in a clockwise direction; and Figure 4 is also a diagrammatic view showing the operation of the stripper at a stage just prior to complete removal of the sections.

The fruit to be sectionized according to the process of this invention is put through the usual preliminary treatment of peeling and removing the membrane from the outer surface of the fruit. The peeled fruit is then treated to separate a majority of the sections of the fruit from the adjoining section walls thereby allowing the sections to be removed as substantially whole, unbroken sections, and then the fruit, with only a few sections remaining, is treated in the novel manner of this invention to remove the remaining sections completely. The removal of the majority of sections can be accomplished, of course, by the hand sectionizing procedures generally employed in sectionizing plants, but for the advantages of this invention to be fully realized, the removal of the majority of sections will be accomplished by automatic machinery.

Since it is not necessary in the process of this invention to remove all of the sections from the citrus fruit in the first phase of the operation, machinery now available may be used satisfactorily. This removal is accomplished by rupturing the bonds connecting sections with both of the adjacent section walls. The rupture of the bond may be effected by passing knives radially outward along the section walls or by a plurality of descending wedge-shaped knives in the manner described in our Patent No. 2,199,345, or by the use of rotary rods in the manner described in Patent No. 2,489,195. A plurality of the knives or rotary rods are passed polarwise through the fruit adjacent the core and the cutting edge moved outwardly to rupture the bond joining the sections and section walls. This procedure is effective in rupturing the bonds of a majority of the sections of both section walls for complete removal of those sections and rupturing one bond of practically all of the remaining sections. The remaining sections are then treated by the additional steps in the process of this invention for complete removal of the sections from the core and section walls of the fruit.

Apparatus which may be employed in carrying out the final steps of this invention is illustrated in Figure 1 of the drawings. It will be appreciated, of course, that other forms of apparatus may be employed to carry out the procedural steps without departing from the method of the invention and that the apparatus illustrated in Figure 1 is for illustrative purposes only and the invention is not limited thereto.

In Figure 1, a holder designated generally by reference numeral 1, consisting of a plurality of tines 2 spaced at uniform intervals around the circumference of a circle, extends upwardly from a boss 3 which is securely held in an arm 4. During the sectionizing operation, the citrus fruit is impaled on the holder 1 with the tines 2 encircling the core of the fruit. The arm 4, in turn, is secured to a standard 5 extending vertically upward from a suitable base 6.

A spinner, designated generally by reference numeral 7, is rotatably supported directly above the holder 1 and is mounted for axial movement relative to the holder 1. The spinner 7 consists of a plurality of rods 8 spaced about the circumference of a circle having a diameter larger than a circle of which the tines 2 of holder 1 are spaced in order that the rods 8 may move freely down outside of the tines 2 of the holder. Rods 8 extend downwardly from a boss 9 secured to a shaft 10 which is journalled for rotation in suitable bearings 11. The bearings 11 are enclosed at the outer end of an arm 12 which also is supported on the standard 5, in the apparatus illustrated.

A keyway 13 in the standard 5 receives a set screw 14 passing through the arm 12 and thereby fixes the position of the spinner 7 directly above the holder 1, but permits axial movement of the spinner relative to the holder. A rod 15 is connected with the end of arm 12 adjacent the standard 5 and with suitable means such as a cam, not shown, for moving the spinner 7 vertically.

The upper end of shaft 10 extends above the upper surface of bearings 11 to receive a sheave 16. A drive belt 17 engages the sheave and drive means, not shown, to rotate the shaft 10, and, consequently, spinner 7.

In the method of this invention, the peeled citrus fruit are impaled upon the holder 1 with the tines 2 extending polarwise through the apices of the sections of the fruit. Usually the fruit will be impaled upon the holder prior to the slitting steps for rupturing the bond between the section walls and the juice sacs of the citrus fruit sections and the support for the holder moved successively by an intermittent drive arrangement to each of a series of stations for the removal of the majority of the sections. This preliminary removal of a majority of the sections may be accomplished by a number of methods and types of apparatus of the prior art, and, for this reason, it is not herein disclosed. The holder 1 is shown only in position for its operation with the spinner 7.

When the fruit from which the majority of the sections have been removed is positioned on the holder under the spinner 7, the spinner is moved downward and the rods of the spinner are inserted through the fruit radially just outside of the core of the fruit and the tines 3 of the holder 1. The relative positions of the tines 2 of the holder 1 and the rods 8 of the spinner 7 with respect to the sections of fruit are best illustrated in Figure 2 of the drawings.

After the spinner has been inserted polarwise through the fruit relative rotation between the rods 8 and the tines 3 is effected. In the apparatus illustrated in Figure 1, a relative rotation is obtained by means of the drive belt 17 engaging the sheave 16 to turn the shaft 10 and the spinner 7 in a clockwise direction as viewed from above. Clearly, a similar result can be obtained by maintaining the spinner in a fixed position and rotating the holder 1 about a central axis parallel to the tines 2.

Referring to Figure 3 of the drawings, in which the method of removing the sections remaining after preliminary slitting of the bond joining the sections with the section walls, is illustrated at an early stage of the removal, the citrus fruit illustrated has four sections indicated by reference numerals 21, 22, 23 and 24 remaining, each of which is bonded to one section wall. As the rods 8 rotate, they move against the section walls which are still bonded to the juice sacs of the sections of the fruit and on still further rotation reach the position illustrated in Figure 2.

It will be noted that the sections, Nos. 21 and 23, are connected with section walls 25 and 26 respectively, along the leading wall of the section as the spinner is rotated in a clockwise direction, and that sections 22 and 24 are bonded to the section walls 27 and 28 along their trailing surface. When the sections are bonded along the forward wall, in the manner of sections 21 and 23, the rods 8 of the spinner move through the section against the bonded wall and roll the section forward to lie flat against the spindle. As rotation of the rods 8 continues, the rods move along the surface of the section wall and exert a gentle wedging action pushing the juice sacs away from the section wall. This action pushes the apex of the section outward and rolls the section from the section wall without crushing or otherwise destroying the juice sacs.

The rods exert a force separating the sections from the section wall which is substantially perpendicular to the bond joining those two parts of the fruit. This force is exerted only along a narrow band more or less parallel to the rod 8 and immediately ahead of the rod 8 in the region where the actual separation is taking place at any instant and allows rupture of the bond with only a small force exerted on the section wall. It will be particularly noted that the portion of the section wall connected to the section radially outward from the line of rupture of the section from the section wall is under no stress until the actual separation occurs. Hence, forces tending to break the membrane forming the section wall and thereby leaving it connected to the sections are maintained at a minimum.

When the sections are connected to the section wall along the trailing surface of the section, as illustrated by sections 22 and 24, the operation of the rods 8 for the separation of the sections from the section walls is slightly different. Referring to section 22 in Figure 3, as rotation of the rods 8 commences, the rod 8 will move against the connected section wall 27. Further rotation of the spinner rods 8 urges the apex of the section 23 forward and it rolls outwardly and away from the section wall while the remainder of the section lies back against the spinner. The flexibility of the membrane forming the section walls allows the membrane to wrap around the rod 8 and also around the circle formed by the outer surfaces of the tines 2. As in the separation of a section from a connected section wall along its forward face, the separation of section 22 from section wall 27 takes place only along a line substantially parallel to rod 8 at any instant and the portion of the section wall 27 radially outward from the line of separation in the section of the section wall remains unstressed.

In some instances, one or more section walls or membranes may lie between a spinner rod and the first section wall connected to a section. This will not interfere with the operation because of the flexibility of the membranes which are then merely wrapped around the surface of the rods 8 in the manner of section wall 29 in Figures 3 and 4.

The method of sectionizing citrus fruits according to this invention permits the efficient removal of substantially all of the sections of the fruit. This is in contrast with machines relying upon a plurality of descending or outwardly moving knives to slit the sections along the section wall, which, although satisfactory for removing a majority of the sections, leave an excessive number of sections attached to the section walls for commercial use. The removal of a plurality of sections from the fruit removes the support of the remaining sections, and thereby makes it difficult, if not impossible, to direct additional knives properly to slit the remaining bonds of sections to section walls. The rotation of the spinner about the holder insures the removal of all of the sections from the core and section walls.

The method of this invention permits the clean separation of sections from section walls with a minimum of crushing or other destruction of sections. The stresses on the section walls during the spinning operation are very small as compared with methods heretofore available, and there is little danger of tearing the section wall to leave portions of section wall adhering to the section.

While the present invention has been described with respect to the specific embodiments shown and described herein, its concept is not limited thereto, but falls within the scope of the appended claims.

We claim:

1. In a method of sectionizing peeled citrus fruit, the steps of supporting the fruit on a holder engaging the fruit substantially at the core thereof, separating a multiplicity of sections spaced around the fruit from one section wall and separating a multiplicity of spaced sections from the other section wall to remove a majority of the sections from the core of the fruit and leave a minority of substantially spaced remaining sections supported by the core, substantially all of said remaining sections being separated from one adjacent section wall, inserting a rod polarwise into the fruit adjacent to and radially outside of the core, and rotating the rod about the core to wrap the section walls about the core and separate the remaining sections therefrom.

2. In a method of sectionizing peeled citrus fruit, the steps of supporting the fruit on a holder engaging the fruit substantially at the core thereof, separating a multiplicity of sections spaced around the fruit from one section wall and separating a multiplicity of spaced sections from the other section wall to remove a majority of the sections from the core of the fruit and leave a minority of substantially spaced remaining sections supported by the core, substantially all of said remaining sections being separated from one adjacent wall, and moving a substantially rigid element around the core of the fruit immediately adjacent thereto to wrap the section walls around the core and separate the sections from the section walls.

3. In a method of sectionizing peeled citrus fruit, the steps of supporting the fruit on a holder engaging the fruit substantially at the core thereof, separating a multiplicity of sections spaced around the fruit from one section wall and separating a multiplicity of spaced sections from the other section wall to remove a majority of the sections from the core of the fruit and leave a minority of substantially spaced remaining sections supported by the core, substantially all of said remaining sections being separated from one adjacent section wall, inserting a plurality of rods polarwise into the fruit adjacent to and radially outside of the cores, and rotating the rods about the core to wrap the section walls about the core and separate the remaining sections therefrom.

4. In a method of sectionizing peeled citrus fruit, the steps of supporting the fruit on a holder engaging the fruit substantially at the core thereof, separating a multiplicity of sections spaced around the fruit from one section wall and separating a multiplicity of spaced sections from the other section wall to remove a majority of the sections from the core of the fruit and leave a minority of substantially spaced remaining sections supported by the core, substantially all of said remaining sections being separated from one adjacent wall, and moving a plurality of substantially rigid elements around the core of the fruit immediately adjacent thereto to wrap the section walls around the core and separate the sections from the section walls.

5. In a method of sectionizing peeled citrus fruit, the steps of supporting the fruit on a holder engaging the fruit substantially at the core thereof, separating a multiplicity of sections spaced around the fruit from one section wall and separating a multiplicity of spaced sections from the other section wall to remove a majority of the sections from the core of the fruit and leave a minority of substantially spaced remaining sections supported by the core, substantially all of said remaining sections being separated from one adjacent section wall, inserting a rod polarwise into the fruit adjacent to and radially outside of the core, and moving the rod circumferentially about the core between the juice sacs of a section and the adjacent connected section wall to wrap the section wall around the core and separate the section from the section wall.

6. In a method of sectionizing peeled citrus fruit, the steps of supporting the fruit on a holder engaging the fruit substantially at the core thereof, separating a multiplicity of sections spaced around the fruit from one section wall and separating a multiplicity of spaced sections from the other section wall to remove a majority of the sections from the core of the fruit and leave a minority of substantially spaced remaining sections supported by the core, substantially all of said remaining sections being separated from one adjacent section wall, inserting a rod polarwise into the fruit adjacent to and radially outside of the core, and moving the rod circumferentially about the core of the fruit against the side of a section wall opposite a connected section to wrap the section wall around the core and separate the section from the section wall.

RALPH POLK, Sr.
RALPH POLK, Jr.

REFERENCES CITED

The following references are of record in the file of this patent:

UNITED STATES PATENTS

| Number | Name | Date |
|---|---|---|
| 2,199,345 | R. Polk, Sr., et al. | Apr. 30, 1940 |
| 2,240,909 | R. Polk, Sr., et al. | May 6, 1941 |
| 2,538,591 | R. Polk, Sr., et al. | Jan. 16, 1951 |